Patented May 29, 1928.

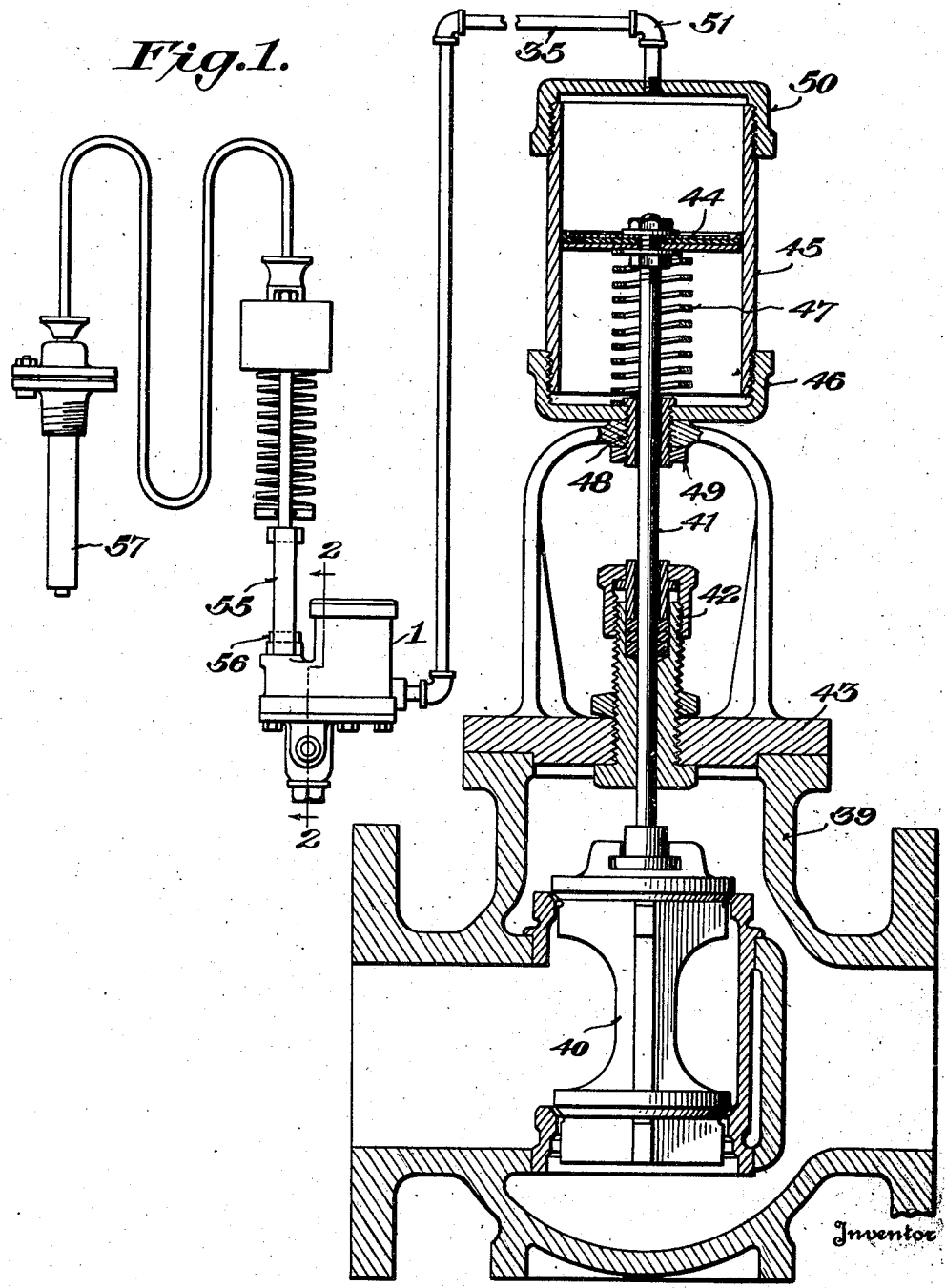

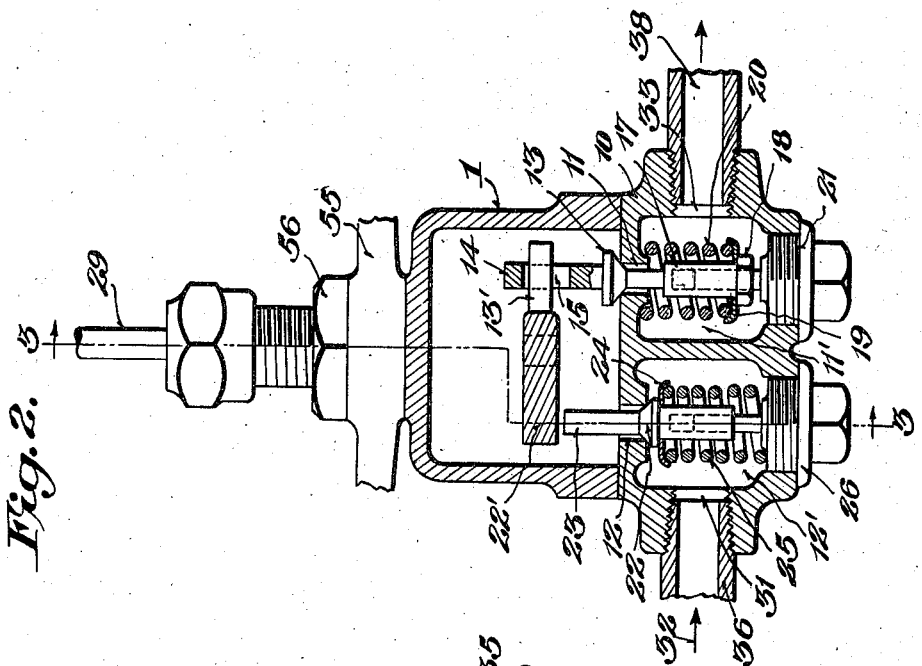
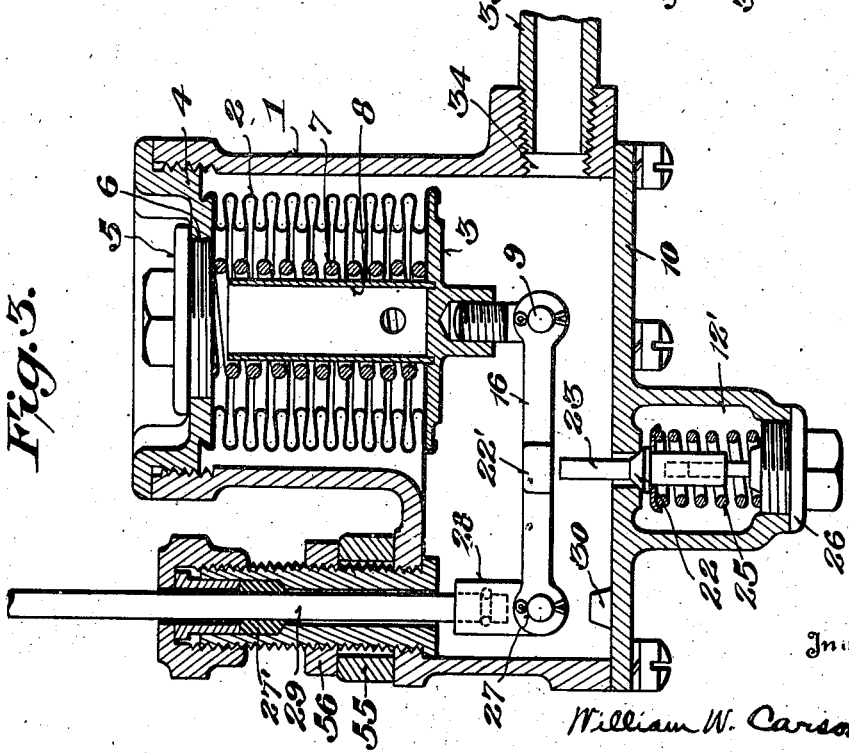

1,671,511

UNITED STATES PATENT OFFICE.

WILLIAM W. CARSON, JR., OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

REMOTE-CONTROL PILOT VALVE.

Application filed January 29, 1926. Serial No. 84,773.

This invention relates to remote control pilot-valves. As heretofore constructed, pilot-valves of this class have been defective in that there is usually a wastage of the actuating medium for said valves, or a flow of the medium at all times except when the main valve is fully opened or fully closed. The object of the present invention is to provide an improved pilot-valve of this character which in operation shall avoid a wastage of the motive medium, such as water, steam or gas, except at the time when the main valve is changing position. The invention is particularly useful wherever it is desired either to employ large valves to control the flow of fluid, or where the valves are placed at remote distances from the controlling devices. By the present invention these valves may be controlled by variations in pressure or in temperature or by mechanical means such as a float operating on changes of liquid level.

The inventive idea is capable of receiving a variety of mechanical expressions, one of which, for the purpose of illustrating the invention, is illustrated in the accompanying drawings, but it is to be expressly understood that such drawings are for the purpose of illustration only and are not designed to define the limits of the invention, reference being had to the appended claims for this purpose.

In said drawings:—

Fig. 1 is a side elevation of the invention, partly in section;

Fig. 2 is an enlarged sectional view on the line 2—2 of Fig. 1;

Fig. 3 is a sectional view on the line 3—3 of Fig. 2.

Referring to said drawings, in which like reference numerals indicate like parts throughout the several views, 1 is any suitable housing to contain the pilot-valve mechanism which will be hereafter described. Within the housing is a pressure-responsive power-storing device here shown in the form of a flexible or resilient wall 2, having a movable closure 3 and a fixed closure 4, mounted in the housing 1 in any suitable manner, as by screw-threading the fixed closure 4 into the housing, as clearly shown in Fig. 3. The flexible wall 2 is securely attached to the end closures 3 and 4 in any suitable manner, as by brazing or soldering. A plug 5 closes an opening 6 in the end closure 4, preferably by being screw-threaded therein, and a spring 7 is mounted within the flexible wall 2 under compression between the end closure 3 and the plug 5 against which two parts it reacts. A suitable stop, here shown as a tubular part 8 projecting upwardly from the end closure 3, is provided, the length of this stop being less than the normal length of the flexible wall 2 and the function of said stop being to limit the collapse of said flexible wall. Suitable means are provided for securing to the movable end wall 3 a fulcrum for a lever to be hereinafter described. As here shown, an internally threaded socket projects downwardly from the end closure 3, into which socket is screw-threaded a plug in which is mounted a pin 9 constituting the fulcrum.

The lower part of the housing 1 is closed, fluid-tight, by a bottom plate 10 suitably secured thereto. This plate has two valve openings 11 and 12 formed therein. Valve opening 11 is controlled by a valve 13 provided with an upwardly extending stem 14, in which stem there is an elongated opening 15. A lever 16 pivoted on the fulcrum 9 has an arm or lug 13' (see Fig. 2) extending laterally therefrom and through the opening 15 in the stem 14. Projecting downwardly from the valve 13 through the opening 11 is an extension 17 having a nut 18 on the lower end thereof supporting a washer 19, said nut serving to compress a spring 20 surrounding the extension 17 and reacting to normally hold the valve 13 against the valve seat formed on the upper edge of opening 11. The valve opening 11 leads into a lower chamber 11', which has an opening in its bottom closed by a screw plug 21, through which opening the parts can be assembled, after which the plug is inserted closing the opening fluid-tight. The valve opening 12 is controlled by a valve 22, opening downwardly within a chamber 12' similar to the chamber 11'. Said valve is provided with a stem 23, projecting upwardly through the valve seat or opening 12 and immediately under an arm 22' projecting laterally from the lever 16, and, preferably, immediately opposite the laterally projecting arm 13' on said lever. The valve 22 has a member extending downwardly into the chamber 12' and bearing a spring-washer 24 engaging the valve 22, and a spring 25 reacts between said washer and a plug 26 closing the lower opening in the chamber 12' precisely similar to the plug closure 21 for the chamber 11' heretofore described.

The lever 16, as heretofore described, is fulcrumed at one end to the lower end wall 3 through the fulcrum 9, and at the other end is pivoted, through fulcrum pin 27, to a clevis 28 secured to a stem 29. This stem 29 may have any suitable motion imparted thereto by an automatic variant force, as by a thermostat, a float, or otherwise, tending to rotate the lever 16 around the fulcrum pivot 9. As here shown, said stem has a reciprocating motion through a stuffing box 27' of any suitable construction, and a suitable stop 30 is preferably employed to limit the movement of the stem.

Provided in the wall of the chamber 12' is a suitable opening 31 to admit a motive fluid flowing in the direction indicated by the arrow 32. The chamber 11' is provided with an outlet opening 33, and the housing 1 with an outlet opening 34, from which a conduit 35 leads to the main valve mechanism placed in any suitable or convenient location. This main valve mechanism and its operation will be described later.

Let it be assumed that the conduit 36, leading to the inlet opening 31 in the chamber 12', is connected to any suitable source of fluid under substantial pressure and that the opening 34 in the housing is plugged or closed so that there is no discharge from the casing 1 through the conduit 35. The operation of the device would then be as follows:

If a downward longitudinal movement is imparted to the stem 29 so as to rotate the link 16 about the fulcrum pivot 9, the arm 22' on the link 16 engages the stem 23 on the valve 22 compressing the spring 25, thus moving the valve 22 away from its seat and allowing fluid under pressure to pass from the chamber 12' into the casing 1. This results in an increase in pressure in the casing 1, and, at a certain predetermined pressure, depending upon the adjustment of the spring 7 and the resilience of the flexible wall 2, or the spring 7, or both, said wall will collapse in proportion to the increase in pressure, the end closure 3 thereof moving upward and carrying with it the pin 9. On this movement of pin 9 the lever 16 turns about the fulcrum 27 until the lever arm 22' is withdrawn from the stem 23 of the valve 22, permitting the spring 25 to close said valve, and, if the collapsing movement continues, the arm 13' of the lever 16 contacts with the upper end of the opening 15 in the stem 14 of the valve 13, lifting the latter valve from its seat and permitting a discharge of the pressure in the housing 1 through the chamber 11', the opening 33 and the conduit 38. This discharge of pressure from the housing 1 will permit an expansion of the flexible or resilient wall 2, under the influence of the spring 7 or its own resilience, when the valve 13 will again engage its seat 11.

It will thus be perceived that, if the valves 13 and 22 and their connected parts are properly proportioned, they will both be closed in the normal position of the flexible wall 2 and the stem 29. The first part of the collapsing movement of the flexible wall causes the lever 16 to move away from the stem 23, thus tending to allow the valve 22 to engage its seat and stop the admission of the motive fluid, and if necessary the further movement of the flexible wall raises the valve 13 from its seat and allows the discharge of the motive fluid until a predetermined pressure is obtained in the housing 1.

Now, if, through the action of any suitable variant force, an additional longitudinal movement is imparted to the stem 29, the movement of the various parts occurs through the sequence described above, except that it is necessary to compress spring 7 still further before the valve 13 can be moved from its seat. This increased compression of the spring 7 requires an increase in pressure in the housing 1, which increase within said housing may be secured by downward longitudinal movement of the stem 29, the extent of such increase in pressure in the housing being dependent upon the stiffness or adjustment of the spring 7.

It will thus be seen that there is provided a device in which a predetermined pressure may be maintained in the housing 1 after a longitudinal movement is imparted to the stem 29, and that, thereafter, for any fixed position of the stem 29, this pressure in the housing will remain constant; upon additional inward longitudinal movement of the stem 29, however, the pressure within the housing can be increased to a considerable extent, depending upon the character and adjustment of the spring 7. If the stem 29 is moved longitudinally in an outward direction, however, it will be seen that the lever 16, rotating about the pivot fulcrum 9, will engage the top of the elongated slot 15 in the stem 14 and open the discharge valve 13, thereby decreasing the pressure in the housing 1 and allowing the spring 7 to extend the flexible wall 2 and close the discharge valve 13, thus terminating the discharge from the housing until further longitudinal movement is imparted to the stem 29. It will of course be understood that the interior of the flexible member 2 can either be hermetically sealed or vented to the atmosphere.

For the purpose of illustrating the invention, there is illustrated, in Fig. 1, a suitable valve mechanism whose operation is to be controlled by the pilot-valve heretofore described. The showing of a valve is merely for the purpose of illustrating the invention, since it will be readily understood that the invention may be employed to operate valves, dampers, or other mechanism whose movements it is desired to control.

Referring to Fig. 1, 39 is a suitable valve casing having a poppet valve 40 connected to a stem 41, passing through a suitable stuffing box 42, secured to the cap and yoke member 43. The upper end of the valve stem 41 has a suitable piston 44 secured thereto, which piston works in a cylinder 45. One end of the cylinder is closed by a cap 46 secured thereto by screw-threads or other suitable means, and a spring 47 is compressed between said cap 46 and the piston 44, so that the spring tends to raise the piston 44 and with it the poppet valve 40 from its seat, in the absence of pressure in the cylinder 45 above the piston 44 sufficient to overcome the tension of the spring 47. The cap 46 is secured to yoke member 43 in any suitable manner, as by a screw-threaded boss 48 and a lock-nut 49, thereby retaining the cylinder 45 in a fixed relation to the valve. The end of the cylinder opposite the cap 46 is closed by a cap 50 screw-threaded or otherwise secured thereon, and the conduit 35 opens into the cylinder 45 above the piston 44 through the cap 50 and the elbow 51.

If it be assumed that the tension of the spring 47 is such that the valve 40 is opened when there is an absence of pressure in the cylinder 45 above the piston 44, it will be seen that upon admitting a predetermined fluid pressure into this space in the cylinder there will be caused a downward movement of the piston 44, thus moving the valve 40 toward its seat and tending to restrict the passage controlled thereby and hence the flow of medium, as for example steam, through the valve casing 39. Now, since the pressure in the housing 1 will be transmitted to the cylinder 45 above the piston 44 through the conduit 35, the pressure in the cylinder above said piston will be the same as that of the pressure in the housing 1. It follows from this that the presure in the cylinder 45 above the piston 44 may be determined and controlled by the movement of the stem 29 of the pilot-valve above described. In other words when the stem 29 moves downwardly, the valve 22 will be opened thus admitting fluid pressure into the housing 1 and through the pipe 35 into the upper end of cylinder 45, thus forcing piston 44 downwardly, and when the stem 29 is raised the valve 22 will be closed and valve 13 will be opened so that the pressure will be vented from the housing and cylinder through the conduit 38 and piston 44 will be raised by spring 47. It will further be seen that by reason of the fact that the two lever arms 13' and 22' are oppositely disposed on the lever 16, the movement of each of the valves 13 and 22 corresponds to the movement of a point at a fixed distance from the two fulcrum pins 9 and 27. In the construction shown the lever 16 acts on the valves at a point intermediate the pivots 9 and 27, but this is not essential nor is the ratio of the fixed distances a necessary factor.

Any suitable automatic means may be employed for operating the plunger stem 29. For the purpose of illustrating the invention, such means are shown in the form of a thermostat similar to that shown in Fulton Patent No. 1,102,035, but it is to be understood that such showing is for illustration only and that any suitable thermostatic, pressure, or mechanically operating means may be employed for this purpose.

In Fig. 1 a frame 55 is held in position on the housing 1 by a lock-nut 56. If the thermostatic bulb 57 is installed in heat-interchanging relation with a fluid, such as water in a storage tank or heated air in a drying room, changes in the temperature in the bulb 57 will cause a longitudinal movement of the stem 29, thus effecting a movement of the valve 40 and the consequent control of the fluid passing said valve in accordance with the temperature of the water in the storage tank or the air in the drying room. If, for example, the bulb 57 is installed in a water storage tank, which water is heated by a steam coil in said tank, and the passage of steam to said coil is controlled by the valve 40, it will be seen that the variations in temperature in the storage tank, acting through the stem 29, control the movements of the valve 40, and hence passage of the heating medium to the tank.

In the foregoing description, for the purpose of illustration, the action of the springs 7 and 47 has been referred to in some detail, but it is to be distinctly understood that in each of these cases a spring is shown and described merely as typical of a device which produces the desired results. Any other mechanical equivalent or equivalents of such springs may be employed, provided only that the force exerted against the closure 3 of the flexible wall 2 is variable or that the force exerted against the piston 44 is variable with different positions of the wall head 3 and the piston. It will be readily understood that a constant force would not produce the results desired.

What is claimed is:—

1. In a device of the character described, the combination of a chamber, a pressure inlet port and a pressure exhaust port for said chamber, independent valves controlling said ports, a pressure-responsive device subjected to the pressure in said chamber, a movable element subjected to the action of a variant, and a lever having a fulcrum on said pressure-responsive device and a fulcrum on said movable element and in operative relation with said valves.

2. In a device of the character described, the combination of a pressure chamber, a pressure inlet port and a pressure exhaust port for said chamber, independent valves controlling said ports, a pressure-responsive power-storing device in said chamber, a movable element subjected to the action of a variant, and means alternately controlled by said movable element and power-storing device and in operative relation with said valves.

3. In a device of the character described, the combination of a pressure chamber, a pressure inlet port and a pressure exhaust port for said chamber, independent valves controlling said ports, a spring-pressed diaphragm subjected to the pressure in said chamber, a variant-actuated element in said chamber, and a lever having a fulcrum on said diaphragm and on said variant-actuated element and in operative relation with said valves.

4. In a device of the character described, the combination of a pressure chamber, a pressure inlet port and a pressure exhaust port for said chamber, independent valves controlling said ports, a pressure-responsive device subjected to the pressure in said chamber, a thermostatically controlled element movable in said chamber, and a lever having a fulcrum on said element and on said pressure-responsive device and in operative relation with said valves between said fulcrums.

5. In a device of the character described, the combination of a pressure chamber, a pressure inlet port and a pressure exhaust port for said chamber, independent valves controlling said ports, a pressure-responsive device subjected to the pressure in said chamber, a movable element subjected to the action of a variant, and a lever having a fulcrum on said pressure-responsive device and a fulcrum on said movable element, said lever operatively engaging said valves at the same distance from either of said fulcrums.

6. In a device of the character described, the combination with a pressure chamber having a pressure inlet port and a pressure exhaust port, oppositely disposed independent valves controlling said ports, a pressure-responsive device subjected to the pressure in said chamber, a movable element subjected to the action of a variant, and a lever having a fulcrum on said pressure-responsive device and a fulcrum on said movable element, and oppositely projecting arms on said lever, one of said arms being in operative relation with one of said valves and the other arm in operative relation with the other valve.

7. In a device of the character described, the combination of a pressure chamber having a pressure inlet port and a pressure exhaust port, independent valves controlling said ports, a flexible vessel having a movable end wall subjected to the pressure in said chamber, a stem having one end projecting into said chamber and the other end subjected to the action of a variant, and a lever having a fulcrum on said wall and a fulcrum on said stem within said chamber and in operative relation with said valves.

8. In a device of the character described, the combination of a chamber, a pressure inlet port and a pressure exhaust port for said chamber, a pressure responsive device in said chamber, a movable element subjected to the action of a variant, oppositely acting valves respectively controlling said inlet port and said exhaust port, and means fulcrumed on said pressure responsive device and on said element and operatively related to said valves to control the admission to and exhaust of pressure from said chamber.

9. In a device of the character described, the combination of a pressure chamber, an inlet port and an exhaust port for said chamber, a pressure responsive device subjected to the pressure in said chamber, a movable element subjected to the action of a variant, a member fulcrumed on said pressure responsive device and on said element, and independent valves respectively controlling said ports and disposed on opposite sides of said member in operative relation thereto.

10. In a device of the character described, the combination of a pressure chamber, an inlet port and an exhaust port for said chamber, a pressure responsive device subjected to the pressure in said chamber, a movable element subjected to the action of a variant, a member fulcrumed on said pressure responsive device and on said element, and independent valves respectively controlling said ports and disposed on opposite sides of said member, said valves being operatively related to said member at equal distances from the fulcrums thereof.

11. In a device of the character described, the combination of a pressure chamber, an inlet port and an exhaust port for said chamber, a pressure responsive device in said chamber, a movable element in said chamber subjected to the action of a variant, independent valves respectively controlling said ports, and means operatively related to said valves and operatively connected to said pressure responsive device and said movable element for operating said valves only upon a change in position of said pressure responsive device or said movable element.

12. In a device of the character described, the combination of a pressure chamber, an inlet port and an exhaust port for said chamber, a pressure responsive device in said chamber, a movable element in said chamber subjected to the action of a variant, independent valves respectively controlling said ports, and a member operatively related to said valves and fulcrumed on said pressure responsive device and said movable element, said member cooperating with said valves to maintain a predetermined pressure in said chamber dependent upon the position of said element.

In testimony whereof I have signed this specification.

WILLIAM W. CARSON, Jr.